United States Patent [19]

Pera

[11] Patent Number: 4,496,946
[45] Date of Patent: Jan. 29, 1985

[54] PROGRAMMABLE ELECTRONIC DISPLAY

[75] Inventor: Eugene R. Pera, San Francisco, Calif.

[73] Assignee: Peratron Corporation, New York, N.Y.

[21] Appl. No.: 424,870

[22] Filed: Sep. 28, 1982

[51] Int. Cl.³ .............................................. G09G 3/22
[52] U.S. Cl. .................................. 340/796; 340/701; 340/780; 340/810
[58] Field of Search ............... 340/794, 795, 810, 760, 340/780, 701, 815.1, 802, 796, 806, 809, 815.07

[56] References Cited

U.S. PATENT DOCUMENTS

| | | | |
|---|---|---|---|
| 1,072,152 | 9/1913 | Ocampo | 340/810 |
| 1,760,159 | 5/1930 | Mathes | 340/802 |
| 1,967,150 | 7/1934 | Presti | 340/809 |
| 1,989,633 | 1/1935 | Collard | 340/752 |
| 2,154,109 | 4/1939 | Parks | 340/701 |
| 3,273,140 | 9/1966 | Foster et al. | 340/810 |
| 3,284,663 | 11/1966 | Stocker | 340/701 |
| 3,631,461 | 12/1971 | Powell et al. | 340/701 |
| 3,814,848 | 6/1974 | Kyte | 340/796 |
| 4,063,234 | 12/1977 | Arn et al. | 340/780 |
| 4,283,659 | 8/1981 | Beckerman et al. | 340/780 |

Primary Examiner—Gerald L. Brigance
Attorney, Agent, or Firm—Milton M. Field

[57] ABSTRACT

An electronic display is disclosed herein having a large display medium divided into a plurality of sections arranged in a multiplicity of rows. Each section includes illuminating devices of three different colors. An image source provides cinematographic data in the form of electronic signals derived from energization of photocells in response to a light source passing through a moving film strip containing a series of color images. A master clock provides timing pulses through a row and line selection circuit which applies the cinematographic data signals to selected rows and illuminating devices in the sections thereof so that a duplicate image of the film is displayed on the screen.

4 Claims, 13 Drawing Figures

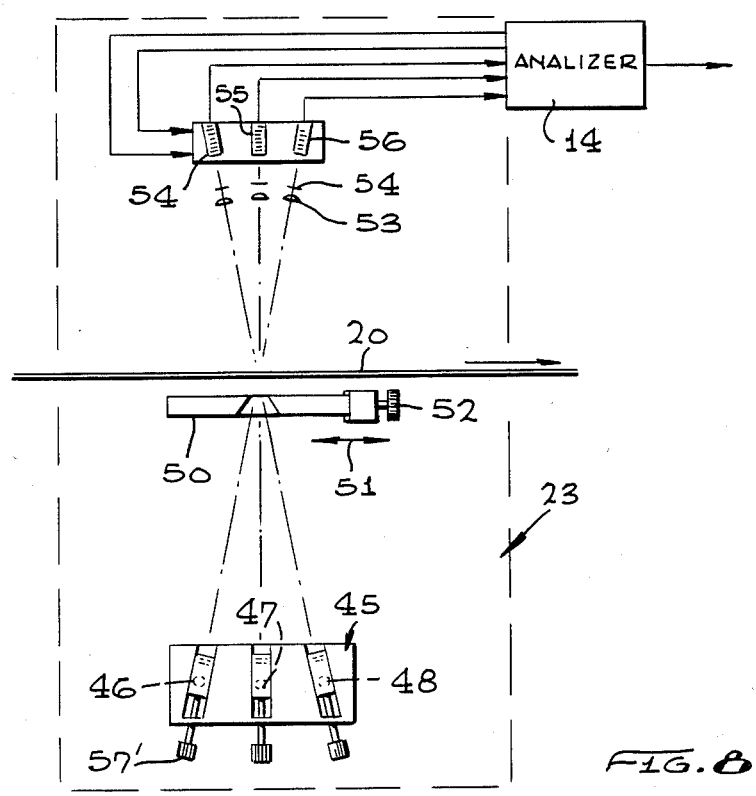
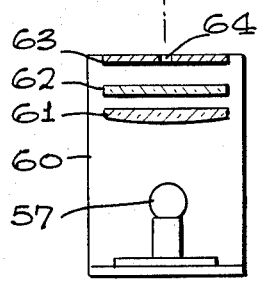
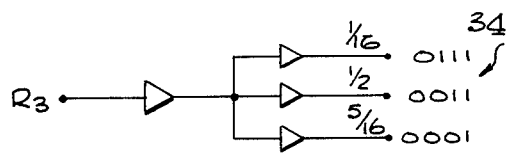
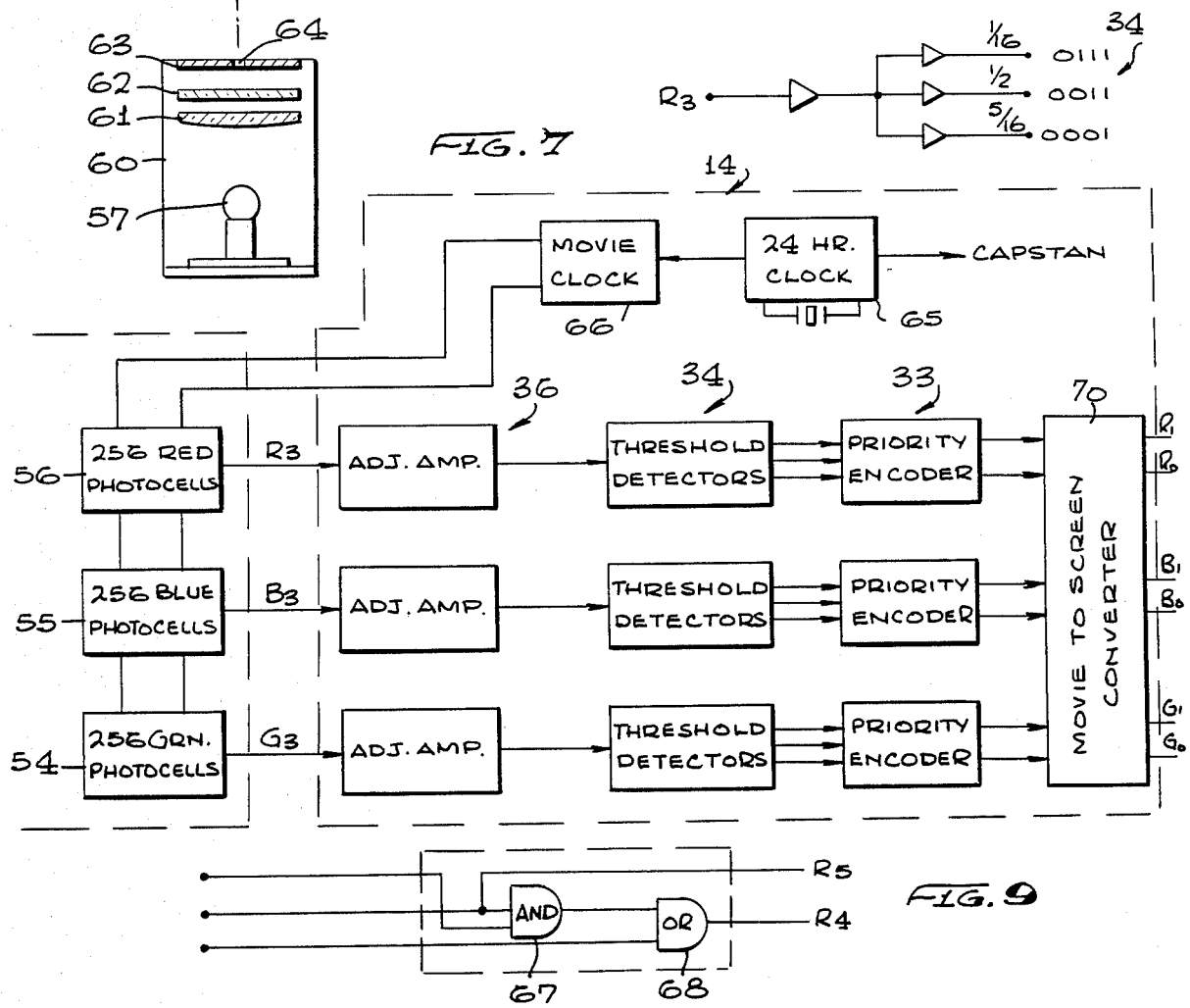

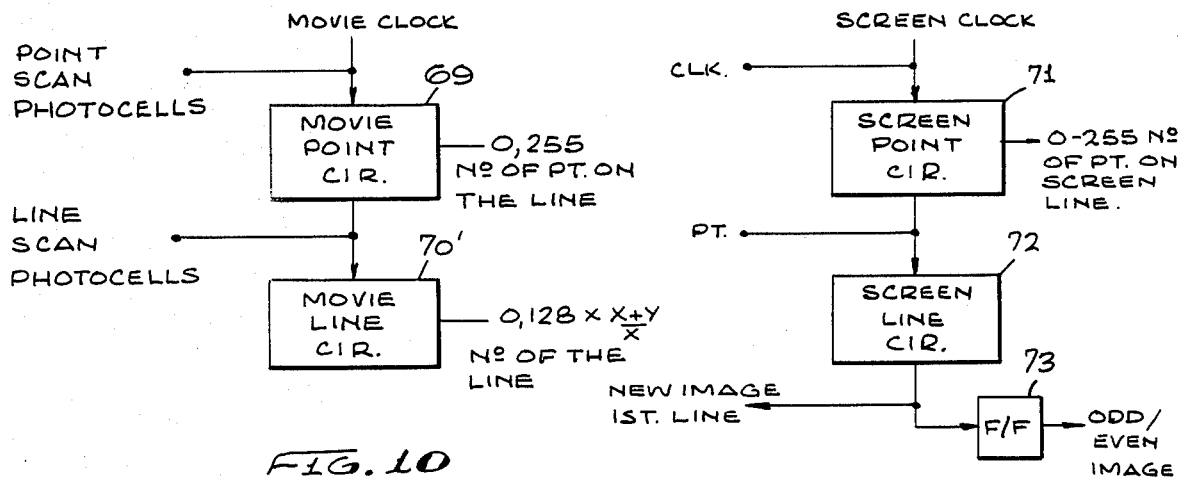
FIG. 10
FIG. 11
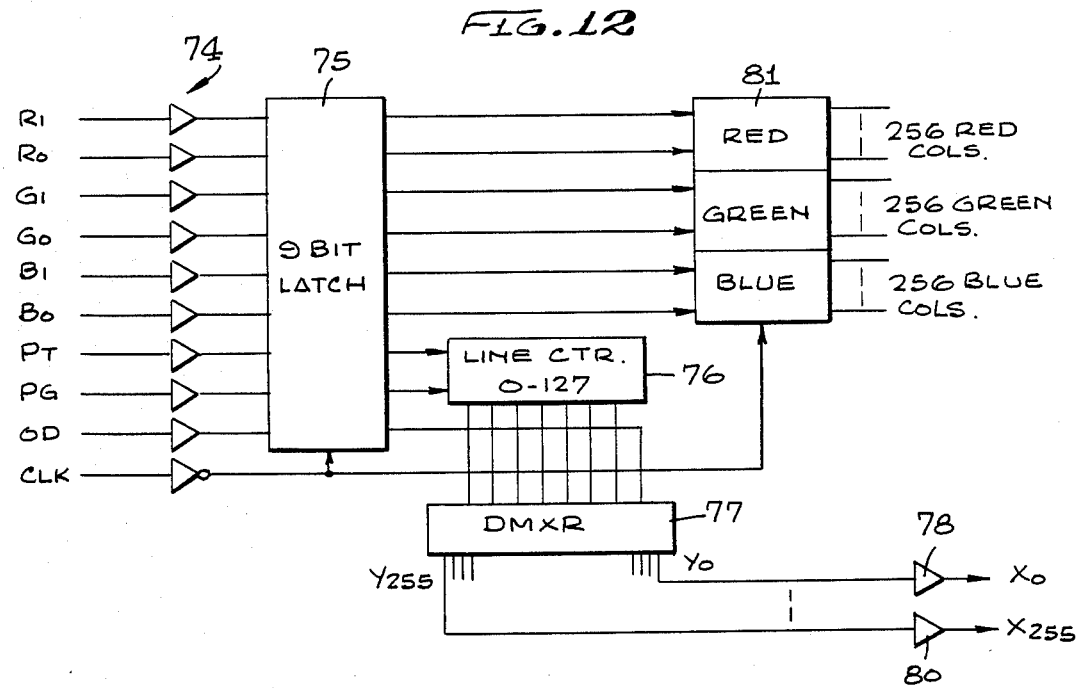
FIG. 12
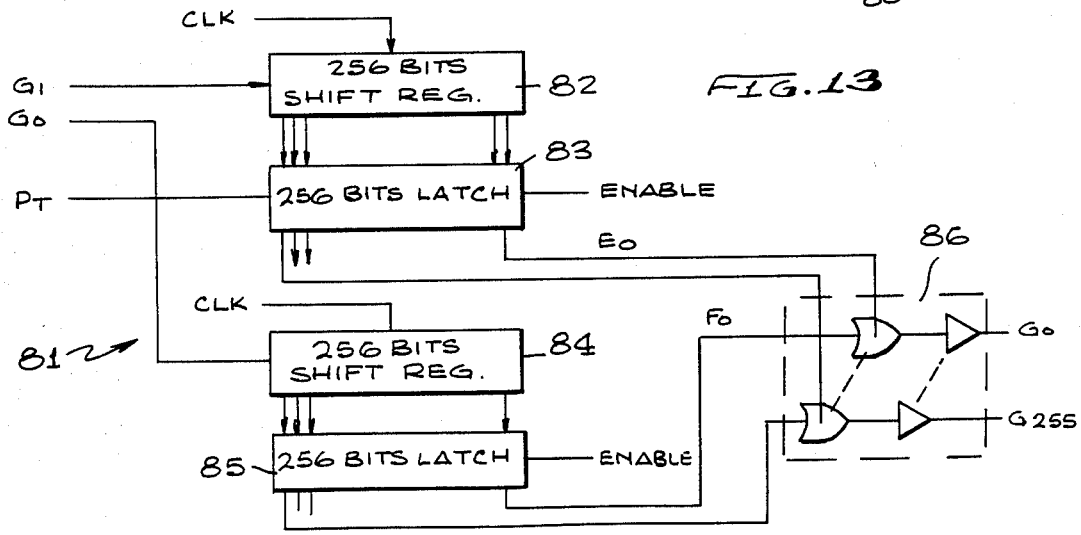
FIG. 13

PROGRAMMABLE ELECTRONIC DISPLAY

BACKGROUND OF THE INVENTION

1. Field of the Invention

The present invention relates to programmable electronic displays and more particularly, to such displays wherein a plurality of illuminating devices arranged in rows and sections are selectively controlled and energized by data signals derived from a photoelectric sensing and signal producing means which translates a film image into the data signals.

2. Description of the Prior Art

Electronic displays in which messages, graphic material and alphanumeric characters are displayed have gained wide spread acceptance because such displays are very effective in attracting the attention of viewers, customers or the like. Typically, such prior displays have one or more rows of individual character displays, each of which generally exhibit any letter of the alphabet, any numeral, or certain symbols designating special purposes. By appropriate wiring and programming means, the sign or display can be made to indicate any word, message or sequence of messages.

A principal shortcoming of prior art electronic displays and signs resides in their complexity and relatively high cost. Furthermore, such prior displays are limited to a relatively small size of display such as a cathode ray tube or to the physical limitations of a projection system which is usually under one hundred inches in diagonal measurement. Although large displays are employed in film projection or cinematographic projection, screens are substantially greater with the resultant limitation of light intensity in relation to distance of projector throw as well as the size of beamed image and the interference of shadows produced by opaque objects intercepting the projection beam.

Furthermore, in most prior art displays, character information is monochromatic specifying the desired message or graphics in an alphanumeric code format. Complex decoding was required to convert this alphanumeric code into drive signals to energize the requisite display segment which produced corresponding characters or graphics. A memory capable of storing such multi-bit alphanumeric codes is required and entry of new messages, instructions or graphics necessitated coding into this format. Thus, in certain systems, it was necessary to prepare a prerecorded set of instructions necessary to enter this new data into the memory. When display of color information is required, the prior systems are extremely complex since so much more additional information is required to be included in the instructive format.

It is for the above reasons, that it is extremely difficult to convert color images, as an example, on a film strip into an identical display information on a large screen presentation. Therefore, a need has existed to employ larger screens for color graphic display requiring little space or volume and which is capable, such as in the instance of cinematographic projections, viewing the colored images in broad daylight on a large screen without the limitation of light intensity reduction.

SUMMARY OF THE INVENTION

Accordingly, the above problems and difficulties are obviated by the present invention which provides an electronic display system incorporating a large display medium composed of illuminating means arranged in rows and sections which are selectively energized by a series of data signals produced in an analyzer means wherein color images derived from a film strip are reproduced and visually presented on the display medium. The analyzer means includes photoelectric sensing of the film image to produce a sequence of input signals which are introduced to an analog-to-digital converter for processing via threshold detectors and priority encoders so that the resultant data signals are produced for operating the selected illuminating means. The analyzer means further includes a timing means and clock means for scanning the data signals and controlling the input of the signals to selected ones of the illuminating device rows and sections.

Therefore, it is among the primary objects of the present invention to derive data signals from a color image source and to present the data signals to a large display medium so that the presentation is a duplicate or reproduction of the image source.

Another object of the present invention is to provide a novel display device and system which derives data signal from a colored film strip and via an analyzer means converts the data signals to operating signals for illuminating illumination means reproducing the imagery of the film strip.

Yet another object of the present invention is to provide a novel electronic display device and system which will readily and inexpensively portray a super-large picture or presentation on a screen wherein the color images for the display are derived from a film strip remotely positioned from the screen.

Another object of the present invention is to provide a novel self-radiant kinematic screen and camera system for projecting cinematographic images onto a large screen without encountering adverse effects from intensity of light in relation to distance of projection, size of image and color thereof or interference of shadows produced by opaque objects intercepting a projected beam.

Still a further object of the present invention is to provide a monumental screen in sizes up to 100,000 square feet wherein the luminosity permits daylight viewing without the common limitations of intensity of light and interference of shadow.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 5 is a diagrammatic view of an image source means for deriving an image from a film strip for processing to the analyzer;

FIG. 6 is a cross-sectional sketch of a light source used in the image source employed in FIG. 5;

FIG. 7 is a block diagram of the components employed in the analyzer used in the device as shown in FIGS. 1, 2 and 5;

FIG. 8 is a circuit diagram of a threshold detector used in the analyzer shown in FIG. 7;

FIG. 9 is a logic diagram of a priority encoder used in the analyzer shown in FIG. 7;

FIGS. 10 and 11 are block diagrams illustrating the timing means for applying data signals from the analyzer to selected rows and sections of the screen for energizing the selected ones of the illumination means;

FIG. 12 is a block diagram of a portion of the image to screen converter for applying the data signals from the analyzer in accordance with the timing means clock signals; and FIG. 13 is a block diagram of an example for generating signals associated with energizing illumination devices corresponding to a single color image.

DESCRIPTION OF PREFERRED EMBODIMENTS

Figure 1:
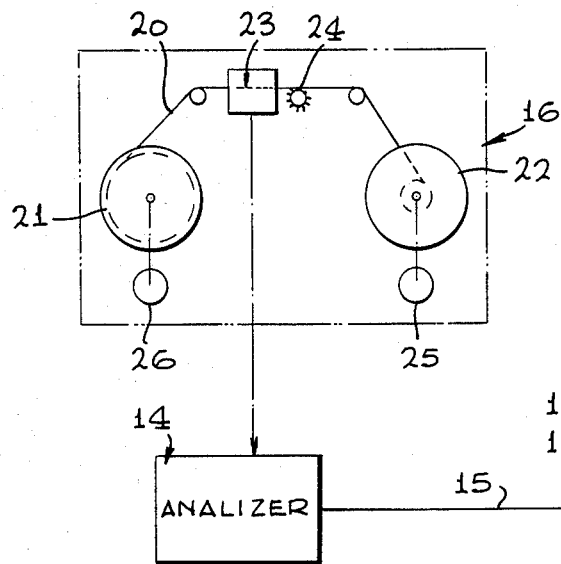
FIG. 1 is a diagrammatic view of an electronic display system incorporating the present invention.

Referring to FIG. 1, an electronic display system incorporating the present invention is illustrated in the general direction of arrow 10 which includes a large display medium such as a screen 11 which may be upwards in area of 100,000 square feet. Regardless of the funnel or display area, the screen is very thin and has a thickness necessary only to mount a plurality of illuminating means (to be described later) in a plurality of rows and sections. For example, screen or panel 11 includes 128 rows of 256 sections. A typical row is illustrated by numeral 12 while a typical section is broadly identified by numeral 13. It will be understood by reading through the description although a row is indicated by a vertical line on the panel or screen 11, sections are indicated as blocks or squares running horizontally across the surface of the screen or panel in parallel columns. It is the primary object of the system to selectively energize the illuminating means in a particular section line on a chosen row so that a pattern or image in color is carried by the screen or panel for a viewing audience.

In order to select illuminating means in a plurality of chosen sections lying on different rows, an analyzer 14 is employed for presenting alphanumeric, graphic or other data in electrical or electronic signals to the screen via a cable 15. When selected ones of the rows are energized, selected illuminating means in each section will be energized. The analyzer 14 derives analog signals from a variety of image sources such as a camera 16 shown in FIG. 1. Other image sources may take the form of a digital processor 17 or images carried on a memory 18 as shown in block diagram form in FIG. 2. However, for illustrative purposes, the image source will be defined as the camera 16 so that a complete and operative system can be described.

With further reference to FIG. 1, the camera 16 provides 10 digital signals to the analyzer 14 and consists of a mechanical mechanism adapted to transport a strip of film 20 between a storage reel 21 and a takeup reel 22. The strip of film 20 is directed through a photoelectric sensing means 23 so that colored images on the film 20 may be sensed and converted to electrical signals constituting the 10 digital signals provided to the analyzer 14. The reels are motor driven and the film is continuously transported from one reel to the other under control of a capstan 24 which assures travel at the rate of 24 images per second. A forward motion motor is indicated by numeral 25 while a rewind motor is indicated by numeral 26 and the transmission between the forward motor and the reel 22 is permitted to allow for shift. It is a constant torque transmission and clutches are provided on the rewind motor for connect and disconnect purposes. The motor drive or the capstan 24 may be the same motor as is employed for the forward or pickup reel 22.

Figure 2:
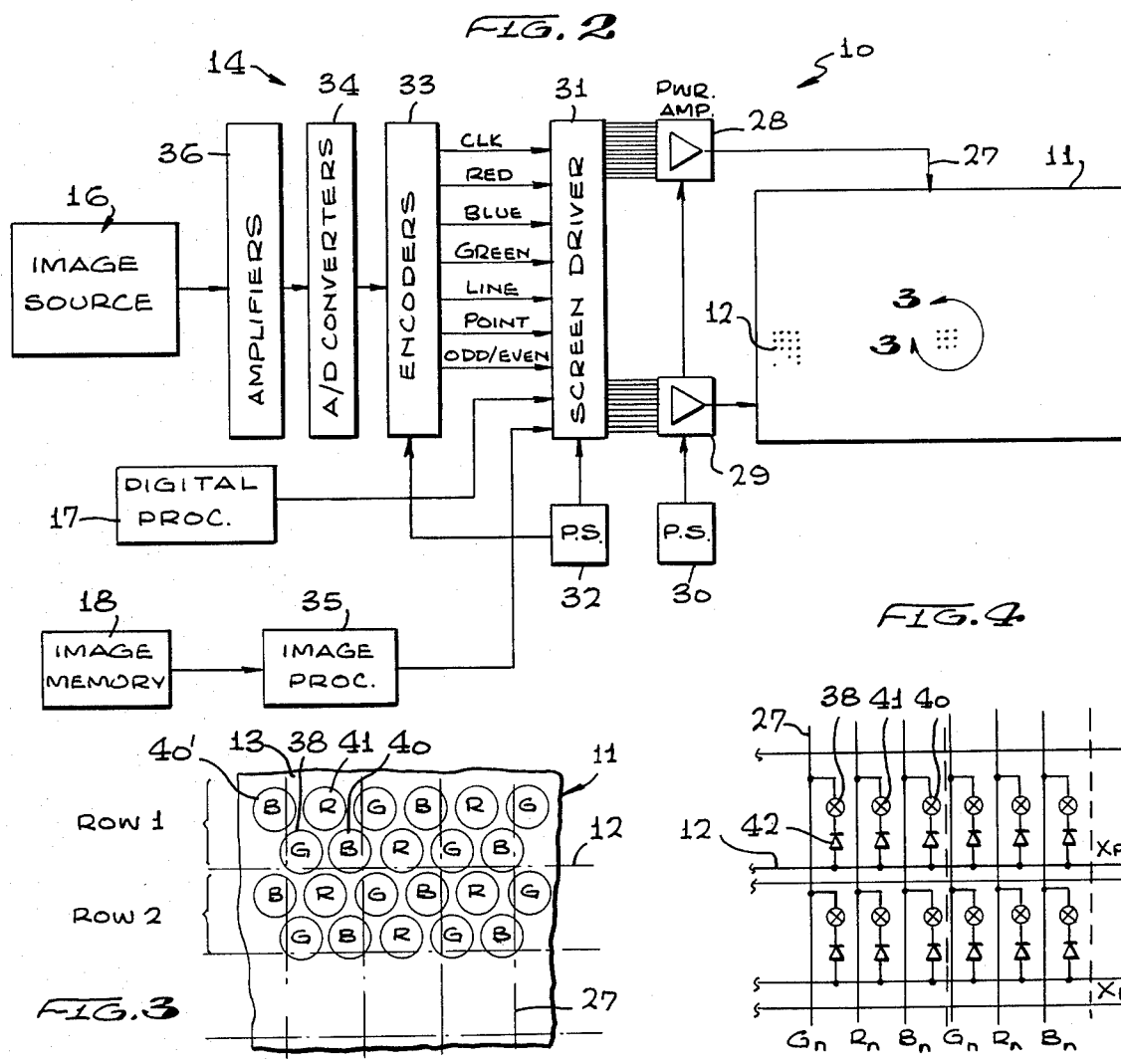
FIG. 2 is a diagrammatic view of the analyzer means employed in the system of FIG. 1.

Referring now in detail to FIG. 2, it can be seen that the rows 12 and the columns, as represented by numeral 27 are connected to a pair of power amplifiers 28 and 29 which are connected to each other, the row and columns, a power supply 30 and to a screen or panel driver 31 from which a plurality of electronic signals are derived. The screen driver 31 is connected to a separate power supply 32 and receives data impulses from an encoder array 33 which in turn receives signals from an analog digital converter 34. The analog to digital converter supplies the screen driver with the following data: timing signals from a master clock, intensity of blue color, intensity of red color, intensity of green color, which line or row is to be energized, a selected point or section (column) on the selected row, whether the row is odd or even. All of this listed information is derived from the camera 16 or from other image processors such as the digital processor 17 or the image memory 18 via an image processor 35. It is to be understood that optional audio systems may be incorporated into the present invention of various types that are synchronized to accompany the images. Such audio systems include radio, audiophones, telephones, loud speakers or the like.

It can also be seen in FIG. 2 that the analog-to-converter 34 is powered by a plurality of amplifiers 36 which in turn are energized by data signals derived from the image source 16.

Figure 3:
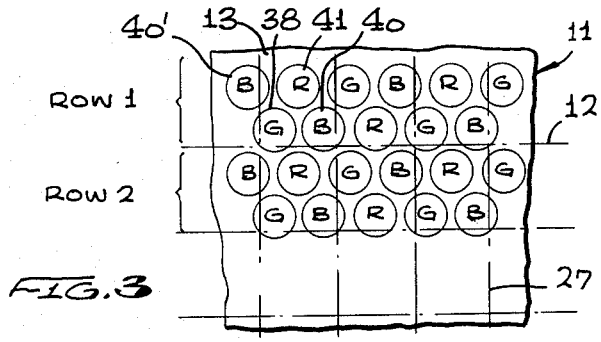
FIG. 3 is an enlarged fragmentary view of a portion of the display screen shown in FIG. 4 illustrating individual illumination devices; taken around 3—3 of FIG. 2.
Figure 4:
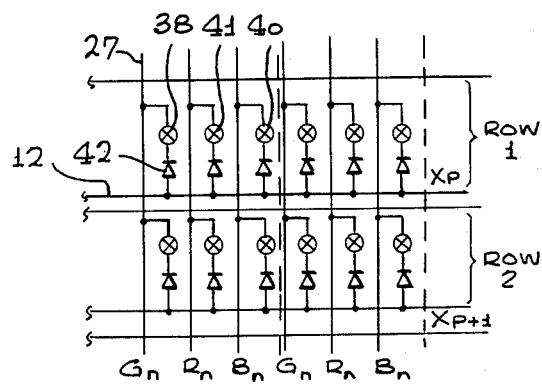
FIG. 4 is a circuit diagram of the illuminating devices shown in FIG. 3.

Referring now in detail to FIG. 3, a fragmentary view of the screen or panel 11 is illustrated wherein row 12 is indicated as row 1 and column 27 is illustrated as crossing line 12 so as to define a point or section intended to be illuminated. It is to be kept in mind that for the purpose of the description of the present invention, 128 rows are employed and 256 points or sections are used. Each point or section contains three light bulbs constituting illumination beams which emits light in three different colors. A green light is identified by numeral 38, a blue light by numeral 40, and a red light by numeral 41. A blue light identified as numeral 40 prime is partially in the section or point defined but primarily resides in the adjacent section of the panel. Each light bulb is connected and preceded by a diode, such as diode 42 as shown in the circuit diagram of FIG. 4. Therefore, each of the light bulbs accepts electric current flowing only in one direction.

Referring now to FIG. 5, the photoelectric sensing means 23 is illustrated which includes a light source 45 composed of three light bulbs identified as a red bulb 46, a green bulb 47 and a blue bulb 48. The light from these bulbs outwardly radiates and beam through an adjustable aperture identified by numeral 50. The plate includes an aperture therein through which the converging light beams pass and the plate may be moved in a rectilinear manner as shown by double arrows 51 and the aperture may also be adjusted by rotation of screw 52. After the color beams pass through the aperture in the plate, they pass through the film 20 and are modified by the image contained on the film so that the resultant beams leaving the film are directed past lenses 53 and color filters 54 to a line of blue photocells 54, a line of green photocells 55 and a line or series of red photocells 56. Data signals from the lines of photocells are then introduced to the analyzer 14 for subsequent processing. Timing signals are provided by the analyzer and are introduced to the line of photocells so that identification of row and column information is initiated depending on the position of the sensing at any given moment of the color image on the film 20 as dictated by the aperture plate 50. Also, it can be seen that an adjustment of the illuminating source such as light bulbs 46, 47 and 48 can be made by rotating of thumb screws 57' associated with each of the light sources which causes the light source to move in a linear manner towards and away from the aperture plate 50.

As shown more clearly in FIG. 6, each light source includes a bulb such as red bulb 57 contained in a housing 60 which also holds a cylindrical lens 61 adapted to focalize the light onto the film so as to provide the access constituting a Y axis. A colored filter 62 is provided in coaxial arrangement with the lens 61 and a fixed diaphragm 63 is also incorporated having an opening 64 lying on the center of the lens and filter.

The cylindrical lenses 53 focalize the respective beams which have been modified by the information acquired by the passage of the beam through the film image into the row of photocells providing the Y axis for the cylinder.

Referring now in detail to FIG. 7, it can be seen that the rows of photocells represent the plurality of points or sections intended to be illuminated so that in the present instance, 256 photocells of each of the respective colors are employed. By triggering the output of the respective photocells according to clock pulses derived from a master clock 65 in the analyzer via a movie clock 66, selected rows of the screen are selected to receive the data impulses. Once the timing pulses have initiated an output from the respective photocells, signals are sent to an adjustable amplifier 36 and then to respective threshold detectors 34 which constitute the analog-to-digital converter. The movie clock 66 provides one pulse for each point or section of the film strip and determines the order of scanning of the photocells. Three threshold detectors are employed in the converter to define the value of the signal as shown more clearly in FIG. 8. The output from each of the threshold detectors represents a binary code signal and is subsequently introduced to a priority encoder 33. Each of the priority encoders take the form of the logic circuit shown in FIG. 9 which transforms the threshold output from the priority encoder into the resultant binary value. The encoder includes an AND gate 67 and an OR gate 68. The output from each of the priority encoders is directed to a movie-to-screen converter 70 which converts the points or sections derived from the film images into the points and sections applied to the screen or panel 11. The movie-to-screen converter converts the points coming from the image into the points going to the screen and recognizes that on the analyzer or camera side, the number of lines represents 0–127, 128 and ... 160 while the number of the points or sections on the line or row is 0–255. Pertaining to the screen side, the number of rows or lines 0, 2, 4, 6 ... 126, and odd numbers 1,3,5 ... 127 are included within the number of the points on the line 0–255. Therefore, referring to FIG. 10, it can be seen that the point scan photocell receives clock pulses as well as the line scan photocells. The movie point circuit identified by numeral 69 identifies the number of points or sections on a particular line or row while the movie line circuit 70' identifies the number of the row or line.

In FIG. 11, it can be seen that the screen includes a screen point circuit 71 which receives information or data signals from the clock point circuit for identifying the points or sections on the line to be energized while a screen line circuit 72 receives information from the movie line circuit 70' for processing the information through a bistable, flip flop circuit 73 so as to provide an odd or even signal.

Referring now to FIG. 12, it can be seen that the respective outputs from the movie-to-screen converter are applied to the screen side of the system by introducing the signals directly to a line of buffers indicated in the general direction of arrows 74. From the line of buffers, the signals are introduced to a nine bit latch 75 and then to the plurality of respective red, green and blue sections or points in the screen per se. Also, information is provided to the line counter 76 and to a demultiplexer 77 which then transmits control signals over the Y axis to the screen via the amplifiers 78 and 80 respectively.

In FIG. 13, an example is given of a typical green system such as is shown in the green box 81 in FIG. 12. The green box 81 includes a shift register 82 which supplies information to a latch 83. Clock information is also provided to a second shift register 84 as well as to a second latch 85 so that signals are then provided to the screen through logic gate contained within Block 86.

Therefore, in view of the foregoing, it can be seen that the color image appearing on the film can be sensed by the photoelectric means and sensed in an order and sequence according to the timing means so that electrical signals or impulses containing the data can be applied to the screen lines and columns so that the lights in the sections or points will illuminate in accordance with the sequence and timing of the sensing procedure. Since the screen is extremely large, availability of the illuminated image in color is quite startling and attractive. Light intensity from surrounding sources cannot deter from the image illumination.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:
1. An electronic display system, comprising:
a color display panel with relatively large horizontal and vertical dimensions forming a large display area, said panel including a plurality of discrete sections of color illuminating means arranged in rows and columns, each said section including illuminating means for a plurality of colors;
an image signal source comprising means for feeding a film strip carrying a series of color images to be displayed on said display panel, a plurality of light source means for illuminating said film strip in a corresponding plurality of different colors, each of said differently colored light sources being directed through a common aperture onto said film strip, a plurality of photosensing means each re- sponsive to a color generated by a corresponding light source, each of said photosensing means comprising a line of photosensors equal in number to the number of sections in one column on said display panel, each photosensor in a line being responsive to the same color, said plurality of photosensing means generating input signals representing the light from said light sources as modified by a portion of one of said film strip color images exposed to said light;

means for scanning said input signals, and control means for applying the input signals to selected ones of said illuminating means sections, whereby said film strip images are duplicated on said display panel.

2. The invention as defined in claim 1,
further comprising an analog-to-digital converter for receiving said input signals and for applying digital data signals to a screen driver driving said illuminating means.

3. The invention as defined in claim 2, further including priority encoders coupled between said analog-to-digital converter and said screen driver.

4. The invention as defined in claim 1, further comprising means converting said input signals to digital form and wherein said control means includes electronic circuit means for receiving said signals and processing said signals via a shift register network and a demultiplexer for determining selected light energization at a selected section.

* * * * *